INVENTOR
George Gilbert Welsh
BY
KARL W. FLOCKS
ATTORNEY

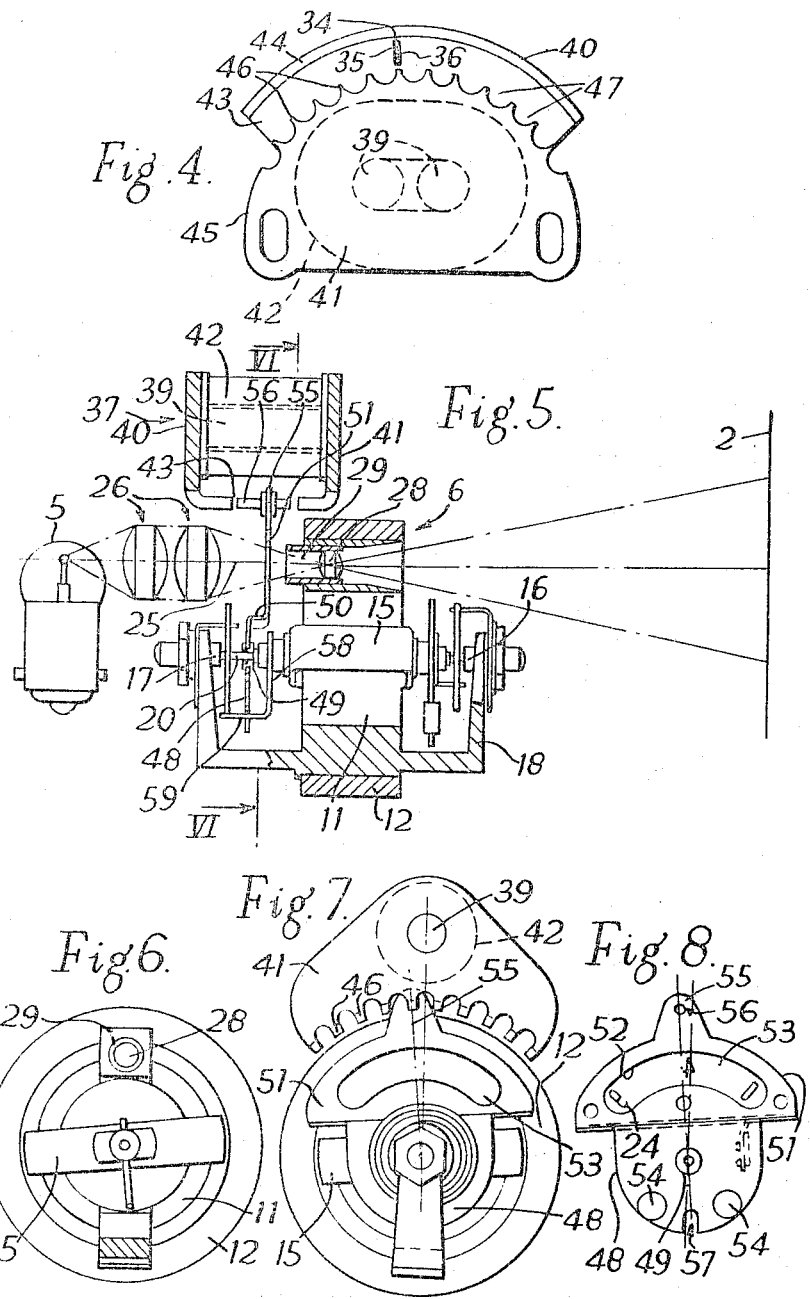

United States Patent Office 3,317,836
Patented May 2, 1967

3,317,836
ELECTRICAL INDICATING INSTRUMENTS FOR USE WITH PROGRESSIVELY VARIED OUTPUTS
George G. Welsh, St. Albans, England, assignor to The Electrical Apparatus Company Limited, St. Albans, England, a company of Great Britain
Filed May 3, 1963, Ser. No. 277,876
Claims priority, application Great Britain, May 4, 1962, 17,226/62
4 Claims. (Cl. 324—132)

This invention relates to electrical indicating instruments of the kind adapted for use with electronic counting units and other apparatus yielding a unidirectional electric current output the magnitude of which can be progressively varied between a minimum value and a maximum value in a plurality of discrete steps so that each value of the output will be representative of a different indication, e.g. of a digit in the series 0, 1, . . . 9 (in the case of a counting unit), of a symbol other than a numeral or of a colour, the instrument comprising a moving coil working in a magnetic field produced by a stator and adapted when supplied with the output to cause a scale bearing representations of the indications, e.g. digits, symbols or colours, to be displaced proportionately to the instant value of the output in order to bring the appropriate representation to a location in which it is displayed to view, whether directly or by projection with the aid of a light beam.

The present invention is of particular value when applied to such an instrument in which a light beam employed for projecting the representations on to a viewing screen is arranged to pass through an aperture in the moving coil meter movement of the instrument. However, the present invention is also of considerable value when applied to other instruments of the kind specified in which the light beam employed for projecting the representations is arranged to pass outside the meter movement, the scale bearing the representations being made of an appropriate size, or being suitably disposed, so that its displacement will traverse the representations through the light beam.

Since the scale length, or the effective scale length in the case where the representations are projected, of an instrument of the kind specified is relatively long, for example about 8″, and only a short portion thereof, for example, about ¼″, is displayed to view at any one time, slight variations in the current flowing through the moving coil can cause the displayed representation to move through an appreciable distance. This makes it necessary accurately to define the various stepped values of the output to be supplied to the coil. However, variations in the ambient temperature may still cause the voltage levels of the circuits providing the output to change.

Moreover, due to its inertia, the moving coil and scale system cannot follow very rapid changes in the output such as are experienced, for example, in electronic counting units. Consequently, while a counting operation is taking place the scale takes up a mean position in which the digital representations 4 and 5 are both partially exhibited, which can be misleading to unskilled operators. Also, when the sampling period of the counting unit is short and is comparable with the resetting period, the moving coil indicator cannot respond accurately to the resultant outputs from the counting unit.

An object of the present invention is to provide improvements in electrical indicating instruments of the kind specified whereby despite slight undesired variations in the stepped values of the output supplied to the moving coil, the indications given by the instrument will always be correctly produced.

According to one feature of the invention, in an electrical indicating instrument of the kind specified, an element of magnetisable material is operatively associated with the scale of the instrument to move therewith, an electromagnet is provided in proximity to the moving coil meter movement with its pole-pieces disposed at opposite sides of the path followed by the element as the scale is displaced and the air gap between the pole-pieces is narrowed at predetermined intervals along the length of the gap so that when the element is disposed in one of the narrow portions of the air gap the scale is accurately positioned to display a corresponding representation thereon.

The narrowing of the air gap may be produced by forming teeth on one or both of the pole-pieces of the electromagnet and the length of each narrow portion of the gap considered in the direction of movement of the element is generally approximately the same as the dimension of the element in that same direction whereas the length of each intervening full-width portion of the gap (in the same direction) is at least equal to said length of the element.

According to another feature of the invention an instrument according to the next-but-one preceding paragraph has the scale coupled to the moving coil by means allowing a small degree of angular play between the two coupled elements.

The electromagnets employed in the instruments according to the invention may be energised the whole time that the moving coil is being supplied with the variable output current or may be energised just prior to and during the taking of a reading from the instrument. The degree of energisation is always such as to cause the magnetic force exerted between the pole-pieces of the electromagnet and the element of magnetisable material associated with the instrument scale to position the element correctly in one of the narrower portions of the air gap should it not be brought into that precise position by the action of the output current due to a slight error or variaion in the value of the latter. The degree of energisation may be sufficiently high, however, to cause the magnetic force to be capable of holding the element in the correct position when the supply of the output current to the moving coil is discontinued. If it is not, the interruption of the supply of the output current will allow the return springs to restore the moving coil to its zero position.

Two examples of the invention will now be described with reference to the accompanying drawings in which:

FIG. 4 is a section on the line IV—IV of FIG. 3.

FIG. 5 is a diagrammatic view partly in longitudinal section showing a modified arrangement.

FIG. 6 is a section on the line VI—VI of FIG. 5.

FIG. 7 is an end view of the arrangement of FIG. 5 with parts omitted, and

FIG. 8 shows the film carrier.

Figure 1:
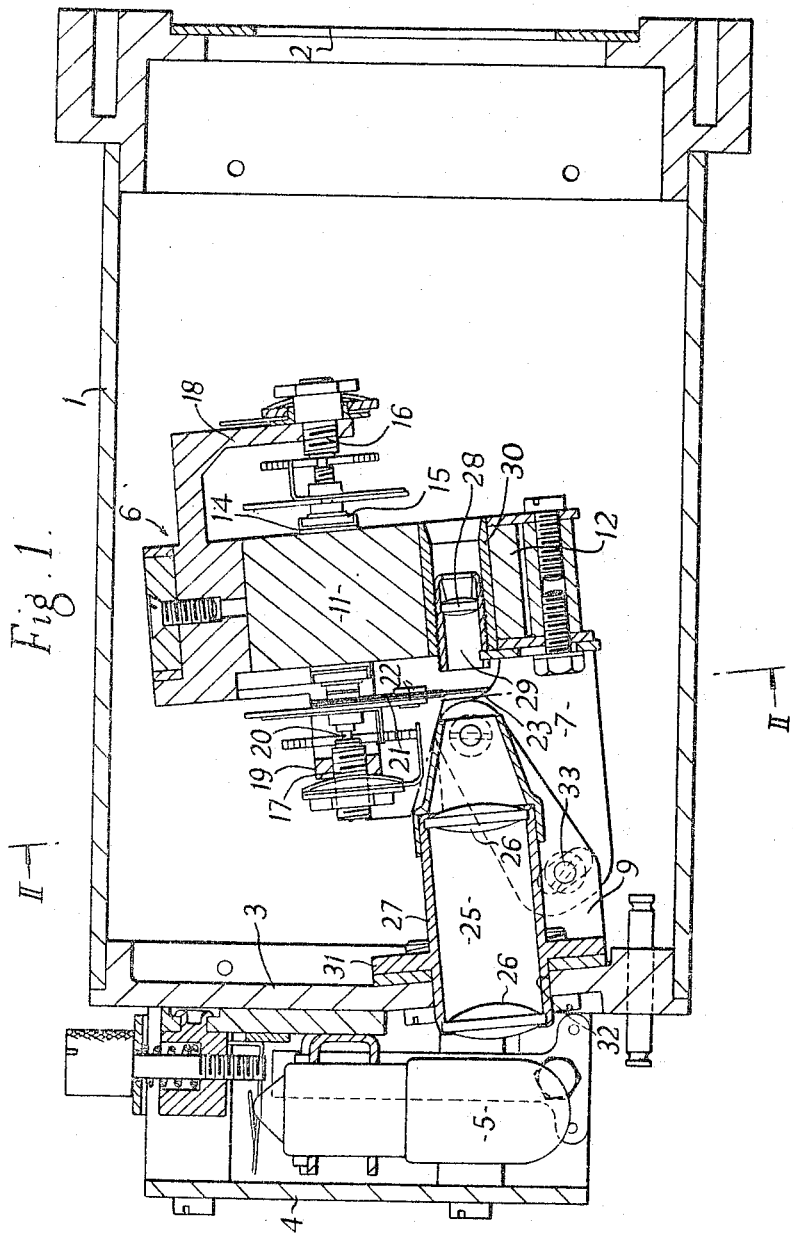
FIG. 1 shows in longitudinal section an indicating instrument to which the invention may be applied.
Figure 2:
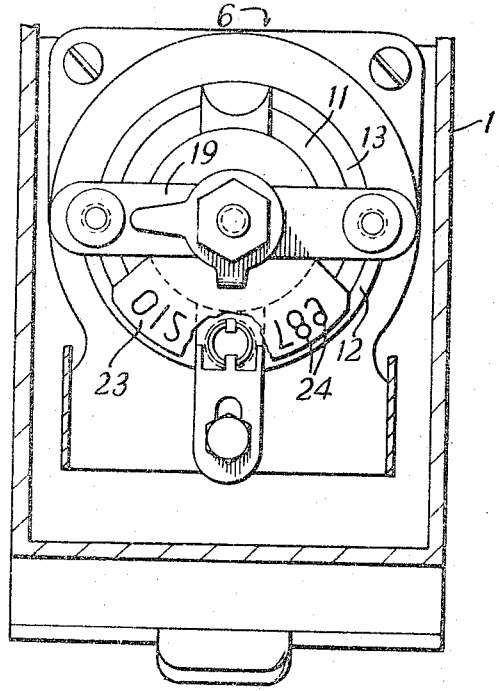
FIG. 2 is a section on the line II—II of FIG. 1 with part cut away.

Referring to FIGS. 1 and 2 of the drawings, these show one form of indicating instrument to which the present invention may be applied. The instrument comprises a generally rectangular casing 1 one end wall of which is provided by a transluscent screen 2 and the other end wall 3 of which carries a container 4 for an electric lamp 5. Within the housing 1 a moving coil electric meter movement indicated generally at 6 is provided with brackets 7 and 8 respectively pivoted to arms 9 and 10 carried by the wall 3.

The meter movement 6 comprises a cylindrical permanent magnet core 11, an annular yoke 12 of magnetisable material co-axial with the core 11 and of such a diameter as to leave between them an annular air gap 13 in which work the legs such as 14 of a moving coil 15 which encircles the core 11 and is pivotally mounted in bearings 16 and 17 respectively carried by arms 18 and 19 forming part of the supporting structure for the movement. One of the pivots 20 for the moving coil 15 carries a flat translucent or transparent sheet 21 clamped between thin brass discs 22, the exposed arcuate marginal portion 23 of the sheet carrying a series 24 of numerals 0 to 9 spaced to represent progressive incremental deflections of the coil 15.

The part 23 of the sheet 21 traverses an optical path, the axis 25 of which extends from the filament of the lamp 5 through a pair of condenser lenses 26 mounted in a tube 27; through an objective lens 28 mounted in a tube 29 slidable in a tubular support 30 located in the lower part of the annular gap 13 of the movement 6 and centrally onto the screen 2. The tube 27 is formed with a flange 31 carried by the wall 3 of the housing 1 so that the rear end of the tube passes through an aperture 32 therein. It will be appreciated that the movement 6 may be pivoted relative to the housing 1 and clamped in position by screws 33 to alter the position on the screen 2 of the projected image of any one of the numerals 24.

Figure 3:
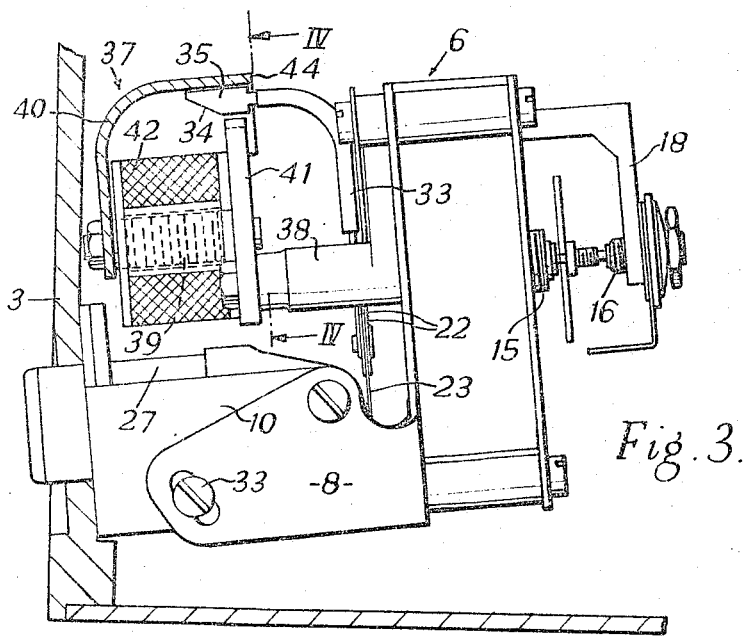
FIG. 3 is a fragmentary view of part of FIG. 1 showing the meter movement in side elevation and incorporating one arrangement according to the present invention in part section.

As shown in FIG. 3 a lightweight member 33 of aluminium for example, is carried with the sheet 21 and extends radially with respect to the axis of the moving coil on the opposite side of the axis from that at which the light beam is disposed. The outer part of the member is bent through 90° and carries at its outer end a small rectangular strip 34 of a magnetisable material, such as soft iron. This strip 34 projects to a small extent at each side of the pin and its medial plane parallel with its faces 35 and 36 contains the axis of the moving coil 15.

An electromagnet indicated generally at 37 is secured on a fixed part 38 of the moving coil meter movement 6, out of the path of the light beam, and comprises a core 39 uniting two pole-pieces 40 and 41 between which is disposed a winding 42 surrounding the core 39. The pole-pieces 40 and 41 are arranged to define a part-annular air gap 43 at such a location that the strip 34 will be moved along the gap as the moving coil rotates, the medial line of the gap being the path followed by the strip.

The pole-piece 40 has a smooth curved edge 44 defining one side of the air gap 43 and the pole-piece 41 has its edge 45 which defines the other side of the air gap formed with teeth 46 which narrow the gap 43 at intervals along its length. Each tooth 46 is narrow and separated from the adjacent tooth by a gap 47 of at least the same width and the teeth are arranged so that when the strip 34 is positioned with its medial plane bisecting any one of the teeth 46 the sheet 21 will be positioned with a respective one of its representations correctly located in the light beam.

It will be seen that when the electromagnet 37 is energised the magnetic flux will be concentrated in the narrower portions of the air gap 43 so that should the strip 34 only be brought into a position close to one of the teeth 46 due to the output current supplied to the moving coil 15 having varied slightly from the intended value, it will be pulled into the correct position centrally of the width of that tooth and the appropriate representation on the sheet 21 will be correctly displayed.

The degree of energisation of the electromagnet 37 (by means not shown) may be such that the sheet 21 will be held in the adjusted position even after the moving coil 15 has been de-energised or when the value of the output current has been changed to a new level. In this case, the electromagnet 37 must be de-energised whenever the moving coil 15 is to be allowed to return to its zero position or to move to a position corresponding to a new reading.

It will be appreciated that the narrowing of the air gap 43 of the electromagnet 37 may be produced by forming opposed teeth on the two pole-pieces, if desired.

In the second example shown diagrammatically in FIGS. 5 to 8 of the drawings the meter movement 6 differs constructionally from that shown in FIGS. 1 to 4 but is in the same general form so that like reference numerals have been used for the same or similar parts.

In this arrangement instead of providing the sheet 21 of the construction of FIGS. 1 to 4 fixedly mounted to move with the moving coil 15 a film carrier 48 is rotatably mounted on the pivot 20 by a ring jewel bearing 49. As shown in FIG. 5 the film carrier 48 is stepped at 50 and outwardly thereof is formed with an arcuate portion 51 of enlarged radius formed with an arcuate slot 52 in which is mounted a transparent or transluscent film member 53 carrying a series 24 of numerals 0 to 9. As shown in FIG. 8 the film carrier 48 is statically balanced above its bearing 49 by balanced weights 54. Centrally of the arcuate portion 51 a radially outwardly projecting arm 55 carries a soft iron rod armature 56 which extends on both sides of the arm 55 with its axis parallel with that of the moving coil 15.

Diametrally opposite the armature 56 the film carrier 48 is formed with a radially directed slot 57. As shown in FIG. 5 a pin 58 is carried by the meter movement to move with the moving coil 15 and has its end 59 bent to pass through the slot 57. The relative dimensions of the pin and the slot are such that a few degrees of relative angular motion can take place between the film carrier 48 and the moving coil 15.

An electromagnet again indicated generally at 37 comprises a single core, 39 carrying a coil 42 and being provided with a pair of generally triangular pole-pieces 40 and 41 the lower edges of which are bent inwardly towards one another and are concavely curved to embrace the path of movement of the armature 56. These lower edges of the pole-pieces are provided with teeth 46 to narrow the gap 43 between the pole-pieces at intervals corresponding with the respective precise positions of the numerals 24 on the film member 53.

When the moving coil 15 is supplied with the output current it rotates the film carrier 48 through the pin and slot connection 58, 57 and thereby positions the film member 53 approximately in the correct setting for displaying the numeral appropriate to the value of the current. The electromagnet 37 being energised then pulls the armature 56 carried by the film carrier 48 into the centre of the nearest narrowed portion of the air gap 43 between the pole-pieces 40 and 41 so that the numeral on the scale is exactly positioned on the axis 25 of the beam of light from the lamp 5. The lost motion provided in the pin and slot connection 58, 57 permits of the correction in the position of the film carrier 48 without any restrain arising due to any inexactness in positioning of the moving coil 15. The degree of energisation of the electromagnet 37 may be selected as described above.

I claim:
1. An electrical indicating instrument comprising a magnet system including a cylindrical core surrounded by an annular air gap, a coil angularly displaced about the axis of said core to move in said air gap substantially proportionally to the instant magnitude of an electric current which is progressively variable in magnitude in a plurality of discrete steps and is supplied to said coil, a light source, a viewing screen, optical means for directing light from said source toward said screen in the form of a beam, a scale operatively associated with said coil and movable therewith, said scale having a curved zone which is traversed through said beam as said coil is angularly displaced, light-transmitting and opaque areas in said zone defining symbols each representative of a different magnitude of said electric current, said areas being so spaced that the symbol appropriate to the instant magnitude of said current will be brought into said beam by the pasage of said current through said coil, an element of magnetisable material operatively connected with said scale to be moved thereby in a given path as said coil is angularly displaced, an electromagnet fixedly mounted in proximity to said magnet system, pole-pieces on said electromagnet disposed upon opposite sides of said given path to define between them an air gap containing said given path and teeth formed on one at least of said pole-pieces to narrow said second-mentioned air gap at predetermined locations along said given path each defining a position of said element in which a different one of said symbols is accurately positioned in said light beam.

2. An electrical indicating instrument according to claim 1, in which said scale is coupled to said coil by means capable of transmitting a positive drive from said coil to said scale in either of its directions of movement but allowing a small degree of angular play between said coupled elements.

3. An electrical indicating instrument according to claim 1, in which said coil in its maximum displacements leaves a part of the first-mentioned air gap untraversed by said coil, said light beam is directed through said part of said first-mentioned air gap in a direction parallel with said axis and said scale is a flat sector having its medial plane at right angles to said axis.

4. An electrical indicating instrument according to claim 1, in which when considered in the direction of movement of said element, each narrowed portion of said second-mentioned air gap is of substantially the same extent as said element and each intervening portion of said gap is of an extent at least equal to that of said element.

References Cited by the Examiner

UNITED STATES PATENTS

| 2,250,969 | 7/1941 | Seefeld | 324—132 X |
| 2,272,242 | 2/1942 | Frischknecht | 340—379 |
| 2,534,925 | 12/1950 | Petzinger | 324—132 |

FOREIGN PATENTS

| 14,240 | of 1909 | Great Britain. |
| 312,522 | 4/1929 | Great Britain. |

WALTER L. CARLSON, *Assistant Examiner.*

RUDOLPH V. ROLINEC, *Primary Examiner.*